Baumann & Mueller,
Clothes Frame.
No. 107,996. Patented Oct. 4, 1870.
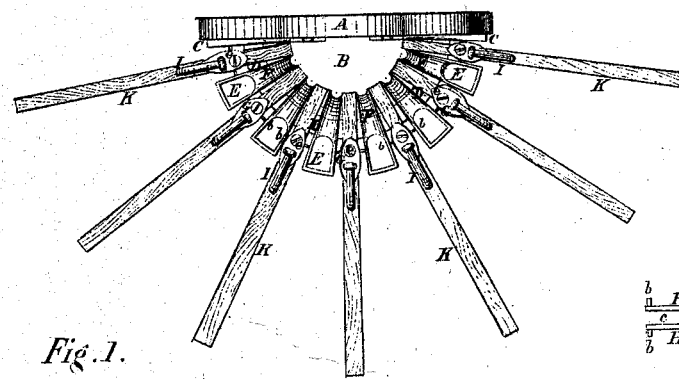
Fig. 1.
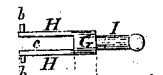
Fig. 4.
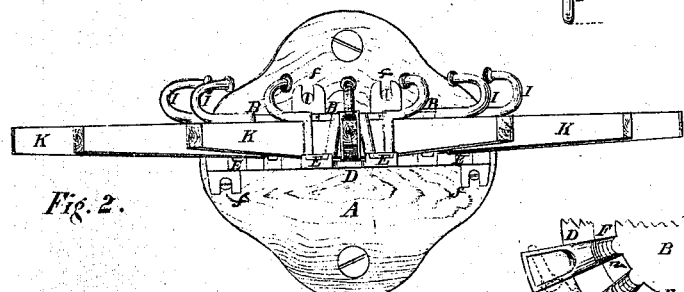
Fig. 2.
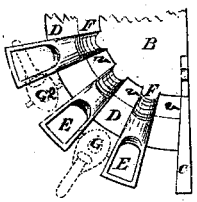
Figs. 5.
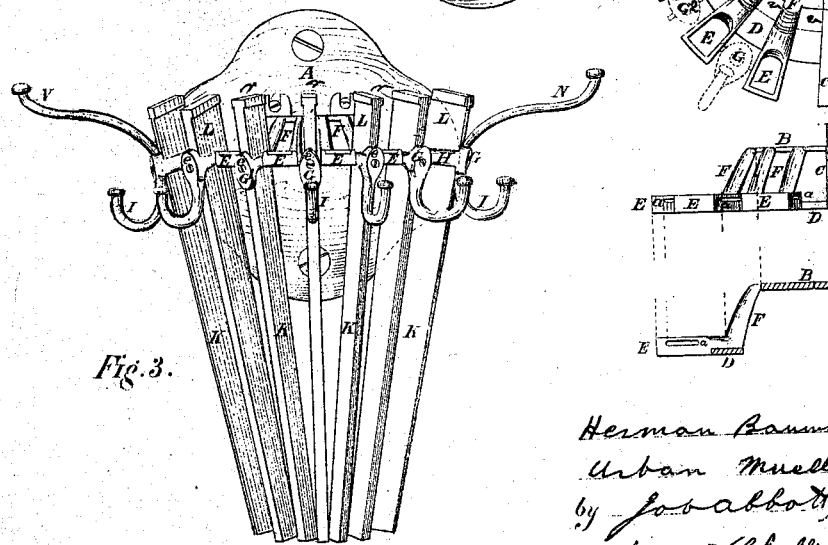
Fig. 3.
Herman Baumann  
Urban Mueller    } Inventors
by Jos Abbott      } Attorney
Andrew Chaffin  
Geo. W. Raff       } Witnesses.